(12) United States Patent
Park et al.

(10) Patent No.: US 6,907,185 B1
(45) Date of Patent: Jun. 14, 2005

(54) METHOD AND APPARATUS FOR RESERVE-RECORDING A VIEWING BROADCAST PROGRAM

(75) Inventors: Kwang-Youn Park, Suwon (KR); Yong-Ho Kim, Kwangmyung (KR)

(73) Assignee: Samsung Electronics Co., LTD, Suwon-si (KR)

( * ) Notice: Subject to any disclaimer, the term of this patent is extended or adjusted under 35 U.S.C. 154(b) by 0 days.

(21) Appl. No.: 09/100,952

(22) Filed: Jun. 22, 1998

(30) Foreign Application Priority Data

Jun. 20, 1997 (KR) .......................................... 97-26306

(51) Int. Cl.⁷ ................................................ H04N 5/91
(52) U.S. Cl. ............................ 386/83; 725/39; 725/58
(58) Field of Search ............................ 386/83; 725/58, 725/137, 141, 153, 56, 57, 39; 348/906, 468; H04N 5/97

(56) References Cited

U.S. PATENT DOCUMENTS

| | | | |
|---|---|---|---|
| 5,166,911 A | 11/1992 | Masawa et al. | |
| 5,270,829 A | 12/1993 | Yang | |
| 5,285,265 A * | 2/1994 | Choi | ......................... 348/565 |
| 5,293,357 A | 3/1994 | Hallenbeck | |
| 5,453,793 A | 9/1995 | Kim | |
| 5,479,266 A * | 12/1995 | Young et al. | ................. 386/83 |
| 5,479,267 A | 12/1995 | Hashimoto | |
| 5,499,102 A | 3/1996 | Hashimoto | |
| 5,543,933 A | 8/1996 | Kang et al. | |
| 5,608,534 A | 3/1997 | Park et al. | |
| 5,646,603 A | 7/1997 | Nagata et al. | |
| 5,682,456 A | 10/1997 | Ishiguchi et al. | |
| 5,699,107 A * | 12/1997 | Lawler et al. | ............... 348/906 |
| 5,802,244 A * | 9/1998 | Kinebuchi | ................... 386/83 |
| 5,856,852 A * | 1/1999 | Huh | ........................... 348/460 |
| 5,930,449 A * | 7/1999 | Hwang | ........................ 386/95 |
| 6,040,829 A * | 3/2000 | Croy et al. | ................. 348/906 |
| 6,058,242 A * | 5/2000 | Kim | ............................. 386/83 |
| 6,130,726 A * | 10/2000 | Darbee et al. | .............. 348/906 |
| 6,154,203 A * | 11/2000 | Yuen et al. | ................. 348/906 |
| 6,173,112 B1 * | 1/2001 | Gruse et al. | ................... 386/83 |

* cited by examiner

*Primary Examiner*—Vincent Boccio
(74) *Attorney, Agent, or Firm*—Robert E. Bushnell, Esq.

(57) ABSTRACT

A viewing broadcast program reserve-recording method and apparatus carries out reserve-recording of a broadcast program while maintaining a currently viewed broadcast picture without interruption. The reserve-recording apparatus pre-stores program identification information, for example, VPS data or KBPS data, contained in a broadcast program of each broadcast station, reads channel data, broadcast date and time contained in program identification information corresponding to the currently viewed broadcast program from the pre-stored program identification information when a key input signal for reserve-recording the currently viewed broadcast program is applied, and stores the read data as reserve-recording information. Accordingly, a subsequent broadcasting portion of a broadcast program can be easily reserved for recording by simply manipulating a key while a user views the broadcast program.

27 Claims, 1 Drawing Sheet

METHOD AND APPARATUS FOR RESERVE-RECORDING A VIEWING BROADCAST PROGRAM

CLAIM FOR PRIORITY

This application makes reference to, incorporates the same herein, and claims all benefits accruing under 35 U.S.C. §119 from an application for METHOD AND APPARATUS FOR RESERVE-RECORDING A VIEWING BROADCAST PROGRAM earlier filed in the Korean Industrial Property Office on the 20$^{th}$ of Jun. 1997, and there duly assigned Ser. No. 26306/1997, a copy of which application is annexed hereto.

BACKGROUND OF THE INVENTION

1. Technical Field

The present invention relates to a method and apparatus for reserve-recording a broadcast program, and more particularly, to a method and apparatus for reserve-recording a currently viewed broadcast program so that, while a user views the broadcast program, a subsequent broadcast portion of the broadcast program is reserve-recorded.

2. Related Art

Generally, when a reserve-recording function of a broadcast program is executed by using a video cassette recorder (VCR) or a television incorporated with a VCR (TVCR), a user sets reserve-recording data such as a recording start time and end time, the channel of a desired broadcast program, types of reserve-recording, for example, once-recording, daily recording, every week recording, etc., and then presses a reserve-recording button. Such a reserve-recording function requires the user to manipulate a number of keys a number of times, and can therefore be very burdensome and susceptible to mal-operations. Variations of this reserve-recording function are disclosed, for example, in U.S. Pat. No. 5,166,911 for Timer Reservation Recording System issued to Misawa et al., U.S. Pat. No. 5,270,829 for Automatically Reserve-Recording And Reserve-Playing Back A Broadcasted Program issued to Yang, U.S. Pat. No. 5,293,357 for Method And Apparatus For Controlling A Television Program Recording Device issued to Hallenbeck, U.S. Pat. No. 5,453,793 for Method For Recording A Series Program In A Video Cassette Recorder issued to Kim, U.S. Pat. No. 5,499,102 for Display Device For Videocassette Recorder Recording Reservations issued to Hashimoto, U.S. Pat. No. 5,543,933 for Reserve-Recording Method And Apparatus For VCR issued to Kang et al., and U.S. Pat. No. 5,646,603 for Remote Control Apparatus For Recording/Playback Equipment, U.S. Pat. No. 5,657,414 to Lett et al, entitled Auxiliary Device Control For A Subscriber Terminal issued to Nagata et al.

Other simplified reserve-recording techniques, such as "G code" recording, have been proposed, such as those disclosed in U.S. Pat. No. 5,479,267 for Device For Combining VCR And TV issued to Hashimoto, and U.S. Pat. No. 5,608,534 for Apparatus And Method For Performing Reservation-Recording Of Video Cassette Recorder issued to Park et al. Generally, the G code is expressed with Arabic numerals up to 8-digits. The G code reserve-recording method uses special codes of programs listed on a newspaper or a TV program guide. When a user notes down special codes of programs listed on a newspaper and enters the numerals of a G code corresponding to the selected program into a VCR, the VCR analyzes the numerals and provides information containing a corresponding channel, reserve-recording start time and reserve-recording end time of a desired program. Thus, reserve-recording can be executed by inputting only numerals, without requiring the user to set information necessary for reserve-recording by manipulating a number of keys a number of times. However, the newspaper or program guide must be referred to. Each broadcasting station transmits a broadcasting signal together with program identification information on a regular broadcast date, time and title with respect to a broadcasting program based on a predefined data format which is specified between broadcasting stations.

The VCR or TVCR has a function of reserve-recording a desired broadcast program and recording the reserve-recorded broadcast program using received program identification information. This function is called a video programming system (VPS) in the case of the European broadcast system and a Korean broadcast program system (KBPS) in the case of the Korean broadcast system. In the case of reserve-recording by the KBPS, the VCR extracts KBPS data contained in a received broadcast signal, pre-stores the extracted data, displays the stored KBPS data on a TV screen, and makes a user select a desired broadcast program. A basic picture viewed with the KBPS data contains a current time, name of corresponding broadcast station, and title of a broadcast program to be broadcasted according to a broadcast schedule. The VCR changes channel automatically according to the KBPS data on a broadcast program selected by the user at the time when the program is broadcasted, thereby allowing a desired broadcast program to be reserve-recorded. However, irrespective of any types of reserve-recording, all conventional techniques require the user to manipulate keys once or more than once to move a cursor on a TV screen to set the reserve-recording function. In addition, when reserve-recording a subsequent broadcast portion of the broadcast program which a user currently views, the conventional technique converts the currently viewed broadcast picture into a reserve mode picture, or into a basic picture of the KBPS data. Therefore, there has been a drawback in that the broadcast program being viewed by the user is interrupted when setting reserve-recording.

SUMMARY OF THE INVENTION

Accordingly, it is therefore an object of the present invention to provide a broadcast program reserve-recording method which can reserve-record a subsequent broadcasting portion of a broadcast program by manipulating a key once while a user views the broadcast program.

It is also an object to provide a broadcast program reserve-recording apparatus which can reserve-record a subsequent broadcasting portion of a broadcast program by manipulating a key once while a user views the broadcast program.

These and other objects of the present invention can be achieved by a method for reserve-recording a viewing broadcast program which comprises the steps of: (a) pre-storing program identification information contained in broadcast programs of broadcast stations; (b) selecting reserve-recording with respect to the currently viewed broadcast program during viewing of the broadcast program; (c) maintaining the current view of the broadcast program selected at step (b) while reading program identification information corresponding to the selected broadcast program from the program identification information stored at step (a); and (d) setting reserve-recording data with the program identification information read at step (c).

In accordance with another aspect of the present invention, a viewing broadcast program reserve-recording apparatus comprises: a first storage unit for pre-storing program identification information contained in a broadcast signal of each broadcast station; a key input unit for applying a key input signal for reserve-recording a currently viewed broadcast program; a controller for maintaining a current broadcast picture without interruption when receiving the key input signal from the key input unit, for reading program identification information corresponding to the broadcast program from the first storage unit, and for setting reserve-recording information with the read information; and a second storage unit for storing the reserve-recording information set by the controller.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
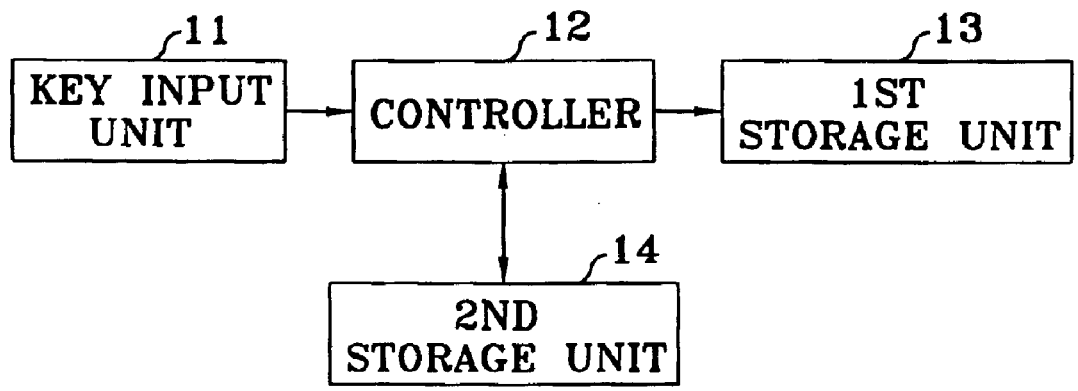
FIG. 1 is a block diagram of a broadcast program reserve-recording apparatus of a broadcast program according to a preferred embodiment of the present invention.

Referring now to the drawings, and particularly to FIG. 1, which illustrates a reserve-recording apparatus of a broadcast program which operates during a user's viewing according to a preferred embodiment of the present invention. A Korean broadcast program system (KBPS) is intended for reserve-recording a desired broadcast program and recording the reserve-recorded broadcast program using received program identification information. As shown in FIG. 1, the reserve-recording apparatus comprises: a key input unit 11 for applying a key input signal to reserve-record a broadcast program during the user's viewing thereof; a first storage unit 13 for extracting KBPS data contained in a broadcast signal of each broadcast station and pre-storing the extracted data; a controller 12 for reading the KBPS data corresponding to a viewing broadcast program from the KBPS data stored in the first storage unit 13 according to the key input signal input from the key input unit 11, and for setting reserve-recording data with the read KBPS data; and a second storage unit 14 for storing the set reserve-recording data.

Figure 2:
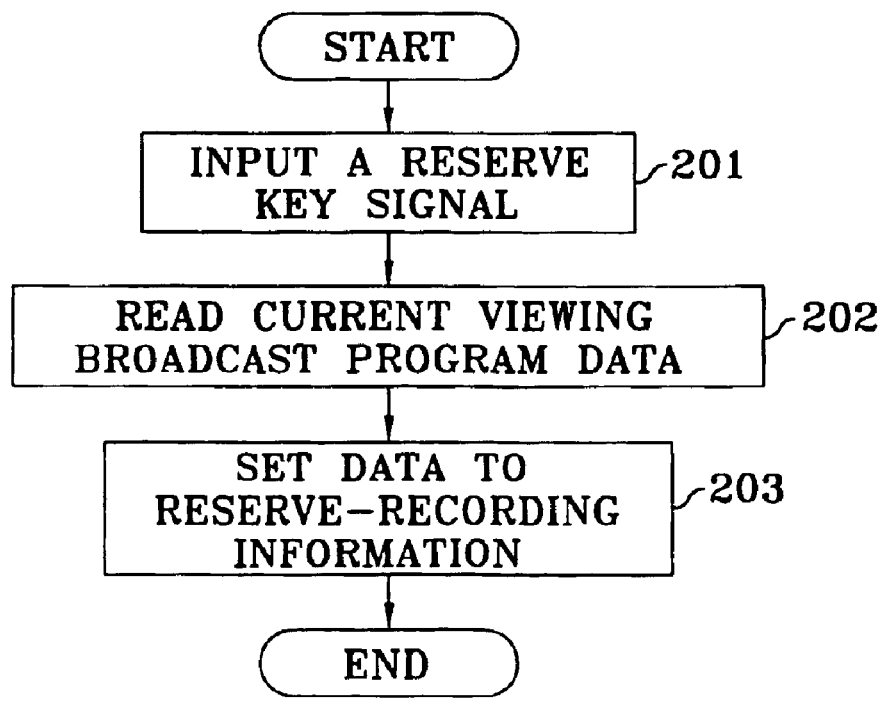
FIG. 2 is a flowchart illustrating an operation of the broadcast program reserve-recording apparatus as shown in FIG. 1.

The operation of the reserve-recording apparatus as shown in FIG. 1 will be described in detail with reference to FIG. 2 as follows.

When a VCR or TVCR is turned on under the condition that a normal broadcast signal is applied, a tuner (not shown) receives a broadcast signal introduced via an antenna and selects the broadcast signal transmitted from each broadcast station according to channels. The first storage unit 13 extracts the KBPS data relating to a broadcast title, broadcast date, start time, end time and name of each broadcast station concerning programs to be broadcasted, and stores the extracted data, wherein the broadcast programs are contained in the broadcast signal of a selected channel.

Meanwhile, if a user inputs a reserve key signal for reserve-recording via the key input unit 11 while watching a broadcast program (step 201), the controller 12 receives the reserve key signal, recognizes the currently viewed broadcast program as a broadcast program to be reserve-recorded, and reads reserve-recording data corresponding thereto from the first storage unit 13 (step 202). At this time, the controller 12 maintains the broadcast picture currently viewed so that the broadcast program being viewed by the user is not interrupted. In step 202, the controller 12 reads the KBPS data corresponding to the broadcast program being viewed from the KBPS data pre-stored in the first storage unit 13. The read KBPS data contains a title, date, time and channel number of a program to be broadcasted. The controller 12 sets reserve-recording data using the same date, time and channel number as a broadcast date, time and channel number concerning the broadcast program included in the KBPS data read from the first storage unit 13 (step 203). The controller 12 stores the set reserve-recording data in the second storage unit 14. When the reserve-recording is set, the controller 12 performs a recording operation according to the reserve-recording data stored in the second storage unit 14 on a stand-by basis.

As described above, the method and apparatus for reserve-recording a broadcast program during a user's viewing thereof according to the present invention is capable of checking data on a broadcast date, time, and channel numbers concerning the broadcast program being viewed from program identification information of pre-stored VPS data or KBPS data, and automatically setting reserve-recording without converting a currently viewed picture into a reserve-recording picture when a reserve key signal for reserve-recording is applied during the viewing of the broadcast program. Therefore, the present invention advantageously permits the subsequent broadcast portion of the current viewing broadcast program to be reserve-recorded without interrupting the viewing of the current broadcast program.

While there have been illustrated and described what are considered to be preferred embodiments of the present invention, it will be understood by those skilled in the art that various changes and modifications may be made, and equivalents may be substituted for elements thereof, without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A method for reserve-recording a broadcast program during viewing by a user, comprising the steps of:

(a) pre-storing program identification information contained in broadcast signals of broadcast stations while viewing a given broadcast program corresponding to said program identification information;

(b) selecting the given broadcast program for reserve-recording during viewing of the given broadcast program;

(c) maintaining the viewing of the given broadcast program selected at step (b) without interruption while reading program identification information corresponding to the selected given broadcast program from the program identification information pre-stored at step (a); and (d) setting reserve-recording data using the program identification information read at step (c);

wherein step(c) comprises maintaining the viewing of the given broadcast program selected at step (b) without degradation of video display of the given broadcast program during viewing of the given broadcast program.

2. The method of claim 1, said program identification information containing broadcast titles, broadcast date, time, and channel data relating to the selected given broadcast program, and said reserve-recording data including channel data, recording date and time which are the same as those contained in the program identification information corresponding to the selected given broadcast program.

3. The method of claim 2, wherein said steps (a) thru (d) are executed by one of a video cassette recorder and a television incorporated with a video cassette recorder.

4. The method of claim 1, wherein said step (a) thru (d) are executed by one of a video cassette recorder and a television incorporated with a video cassette recorder.

5. The method of claim 1, wherein step(c) comprises maintaining the viewing of the given broadcast program selected at step (b) without reduction in size of video display of the given broadcast program during viewing of the given broadcast program.

6. A reserve-recording apparatus, comprising:

a first storage unit for pre-storing program identification information contained in a broadcast signal of at least one broadcast station while viewing a given broadcast program corresponding to said program identification information;

a key input unit for applying a key input signal for reserve-recording the given broadcast program being viewed by a user;

a controller for maintaining viewing of the given broadcast program when receiving the key input signal from the key input unit, for reading the program identification information corresponding to the given broadcast program from the first storage unit, and for setting reserve-recording information in accordance with the read program identification information; and a second storage unit for storing the reserve-recording information set by the controller;

wherein said controller maintains viewing of the given broadcast program without degradation of video display of the given broadcast program while receiving the key input signal from the key input unit, while reading the program identification information corresponding to the given broadcast program from the first storage unit, and while setting the reserve-recording information in accordance with the read program identification information.

7. The reserve-recording apparatus of claim 6, wherein said controller reads channel data, broadcast date and time contained in the program identification information corresponding to the given broadcast program from the program identification information stored in the first storage unit.

8. The reserve-recording apparatus of claim 7, said apparatus being embodied in one of a video cassette recorder and a television incorporated with a video cassette recorder.

9. The reserve-recording apparatus of claim 6, said apparatus being embodied in one of a video cassette recorder and a television incorporated with a video cassette recorder.

10. The apparatus of claim 6, wherein said controller maintains viewing of the given broadcast program without reduction in size of video display of the given broadcast program while receiving the key input signal from the key input unit, while reading the program identification information corresponding to the given broadcast program from the first storage unit, and while setting the reserve-recording information in accordance with the read program identification information.

11. A method of reserve-recording a given broadcast program, comprising the steps of:

receiving a broadcast signal from a broadcast station via an antenna, and extracting program identification information, contained in the broadcast signal, from said broadcast signal;

storing the program identification information, extracted from the broadcast signal, in a first memory while viewing a given broadcast program corresponding to said program identification information;

determining whether a reserve key signal is input by a user for reserve-recording while the user is viewing the given broadcast program;

when the reserve key signal is input by the user during viewing of the given broadcast program, recognizing the given broadcast program being viewed as a broadcast program to be reserve-recorded, and maintaining the viewing of the given broadcast program without interruption; and reading the program identification information corresponding to the given broadcast program from the first memory, setting reserve-recording information in accordance with the read program identification information, and storing the reserve-recording information in a second memory for reserve-recording;

wherein the viewing of the given broadcast program is maintained without degradation of video display of the given broadcast program while receiving the reserve key signal input by the user, while recognizing the given broadcast program being viewed as a broadcast program to be reserve-recorded, while reading the program identification information corresponding to the given broadcast program from the first memory, while setting the reserve-recording information in accordance with the read program identification information, and while storing the reserve-recording information in the second memory for reserve-recording.

12. The method of claim 11, said program identification information containing broadcast titles, broadcast date, time and channel data relating to the given broadcast program, and said reserve-recording data including channel data, recording date and time which are the same as those contained in the program identification information corresponding to the given broadcast program being viewed.

13. The method of claim 12, wherein said steps of said method are executed by one of a video cassette recorder and a television incorporated with a video cassette recorder.

14. The method of claim 11, wherein said steps of said method are executed by one of a video cassette recorder and a television incorporated with a video cassette recorder.

15. The method of claim 11, wherein the viewing of the given broadcast program is maintained without reduction in size of video display of the given broadcast program while receiving the reserve key signal input by the user, while recognizing the given broadcast program being viewed as a broadcast program to be reserve-recorded, while reading the program identification information corresponding to the given broadcast program from the first memory, while setting the reserve-recording information in accordance with the read program identification information, and while storing the reserve-recording information in the second memory for reserve-recording.

16. A method for reserve-recording a broadcast program during viewing by a user, comprising the steps of:
   (a) pre-storing program identification information contained in broadcast signals of broadcast stations;
   (b) selecting a given broadcast program for reserve-recording during viewing of the given broadcast program;
   (c) maintaining the viewing of the given broadcast program selected at step (b) without degradation of video display of the given broadcast program while reading program identification information corresponding to the selected given broadcast program from the program identification information pre-stored at step (a); and
   (d) setting reserve-recording data using the program identification information read at step (c).

17. The method of claim 16, said program identification information containing broadcast titles, broadcast date, time, and channel data relating to the selected given broadcast program, and said reserve-recording data including channel data, recording date and time which are the same as those contained in the program identification information corresponding to the selected given broadcast program.

18. The method of claim 17, wherein said steps (a) thru (d) are executed by one of a video cassette recorder and a television incorporated with a video cassette recorder.

19. The method of claim 16, wherein said step (a) thru (d) are executed by one of a video cassette recorder and a television incorporated with a video cassette recorder.

20. A reserve-recording apparatus, comprising:
   a first storage unit for pre-storing program identification information contained in a broadcast signal of at least one broadcast station;
   a key input unit for applying a key input signal for reserve-recording a given broadcast program being viewed by a user;
   a controller for maintaining viewing of the given broadcast program without degradation of video display of the given broadcast program while receiving the key input signal from the key input unit, while reading the program identification information corresponding to the given broadcast program from the first storage unit, and while setting reserve-recording information in accordance with the read program identification information; and
   a second storage unit for storing the reserve-recording information set by the controller.

21. The reserve-recording apparatus of claim 20, wherein said controller reads channel data, broadcast date and time contained in the program identification information corresponding to the given broadcast program from the program identification information stored in the first storage unit.

22. The reserve-recording apparatus of claim 21, said apparatus being embodied in one of a video cassette recorder and a television incorporated with a video cassette recorder.

23. The reserve-recording apparatus of claim 20, said apparatus being embodied in one of a video cassette recorder and a television incorporated with a video cassette recorder.

24. A method of reserve-recording a given broadcast program, comprising the steps of:
   receiving a broadcast signal from a broadcast station via an antenna, and extracting program identification information, contained in the broadcast signal, from said broadcast signal;
   storing the program identification information extracted from the broadcast signal in a first memory;
   determining whether a reserve key signal is input by a user for reserve-recording while the user is viewing the given broadcast program;
   when the reserve key signal is input by the user during viewing of the given broadcast program, recognizing the given broadcast program being viewed as a broadcast program to be reserve-recorded; and
   maintaining the viewing of the given broadcast program without degradation of video display of the given broadcast program while receiving the reserve key signal, while reading the program identification information corresponding to the given broadcast program from the first memory, while setting reserve-recording information in accordance with the read program identification information, and while storing the reserve-recording information in a second memory for reserve-recording.

25. The method of claim 24, said program identification information containing broadcast titles, broadcast date, time and channel data relating to the given broadcast program, and said reserve-recording data including channel data, recording date and time which are the same as those contained in the program identification information corresponding to the given broadcast program being viewed.

26. The method of claim 25, wherein said steps of said method are executed by one of a video cassette recorder and a television incorporated with a video cassette recorder.

27. The method of claim 24, wherein said steps of said method are executed by one of a video cassette recorder and a television incorporated with a video cassette recorder.

* * * * *